(12) United States Patent  
Beaujot (10) Patent No.: US 8,733,259 B2
(45) Date of Patent: May 27, 2014

(54) SEED METERING APPARATUS FOR A SEEDER

(75) Inventor: Norbert Beaujot, Regina (CA)

(73) Assignee: Straw Track Manufacturing, Inc., Emerald Park, Saskatchewan (CA)

( * ) Notice: Subject to any disclaimer, the term of this patent is extended or adjusted under 35 U.S.C. 154(b) by 214 days.

(21) Appl. No.: 13/067,043

(22) Filed: May 4, 2011

(65) Prior Publication Data

US 2012/0279430 A1    Nov. 8, 2012

(51) Int. Cl.
*A01C 7/00*    (2006.01)

(52) U.S. Cl.
USPC ............ 111/185; 111/178; 111/182; 221/211

(58) Field of Classification Search
USPC .............. 111/174–185, 200; 221/211; 406/68
See application file for complete search history.

(56) References Cited

U.S. PATENT DOCUMENTS

| | | | | |
|---|---|---|---|---|
| 773,205 A * | 10/1904 | Green | ............................ | 221/211 |
| 867,451 A * | 10/1907 | Umrath | .............................. | 111/9 |
| 2,732,975 A * | 1/1956 | Balzer | ............................ | 221/234 |
| 4,379,664 A * | 4/1983 | Klein et al. | ...................... | 406/68 |
| 4,449,642 A * | 5/1984 | Dooley | ............................ | 221/211 |
| 4,514,114 A * | 4/1985 | Fuss et al. | ......................... | 406/65 |
| 4,609,131 A * | 9/1986 | Tieben | ............................ | 222/278 |
| 4,705,220 A * | 11/1987 | Gandrud et al. | ............... | 239/654 |
| 6,308,645 B1 * | 10/2001 | Newkirk et al. | ................. | 111/63 |
| 6,564,729 B1 * | 5/2003 | Petzoldt | ......................... | 111/179 |

* cited by examiner

*Primary Examiner* — Alicia Torres
(74) *Attorney, Agent, or Firm* — Nixon & Vanderhye P.C.

(57) ABSTRACT

A seed metering apparatus includes a seed container with a feed opening in a bottom thereof. A feed shaft is rotatably mounted across the feed opening. A feed disc is mounted to the shaft and disc recesses are spaced along a periphery thereof An upright shield plate extends across the feed opening adjacent to the shaft and defines a disc slot having a width corresponding to a thickness of the disc. An output portion of the feed disc extends through the disc slot forward of a front face of the shield plate. The feed shaft, feed disc, and shield plate are configured such that the shield plate seals the feed opening, and such that an intake portion of the feed disc is in the feed opening exposed to seeds. Rotation of the feed shaft carries seeds out of the seed container in the disc recesses and into a seed receiver.

22 Claims, 8 Drawing Sheets

SEED METERING APPARATUS FOR A SEEDER

This invention is in the field of agricultural implements and in particular a seed metering apparatus for a seeder that provides improved placement of seeds such as canola and corn.

BACKGROUND

In the agricultural industry, considerable research has been done and is ongoing to determine optimum plant spacing for various crops to provide maximum yields. This desired spacing in turn gives a desired plant population of plants per unit of area, such as a square foot or acre. In order to translate this into a usable form for the farmer, the average number of seeds in a unit of weight, such as pounds, is determined for an average sample of representative seeds. The number of desired plants per acre is then translated into a seeding rate of pounds per acre.

Seed sizes and weights as well as desired plant populations vary dramatically between different crops. A typical corn variety has large sized seeds and may have about 1200 seeds per pound, while a typical wheat variety has smaller medium sized seeds and may have about 12,000 seeds per pound, and a typical canola has very much smaller sized seeds and may have about 120,000 seeds per pound.

Similarly desired plant populations also vary dramatically. A typical population for corn may be about 0.5 plants per square foot (22,000 plants per acre), for canola about 5 plants per square foot (220,000 plants per acre), and for wheat about 25 plants per square foot (1,100,000 plants per acre). Canola seed can cost up to $10 per pound, and so current research is showing that the traditional plant population of 10 plants per square foot can be reduced to 5 per square foot if fairly evenly distributed.

Ideally these plants are spaced equally in all directions in a grid like arrangement however in practice a given seeder has a fixed spacing between the furrow openers and so the spacing between the rows of plants is fixed for any particular seeder, typically for a modern minimum tillage air seeder these row spacings are 10-12 inches. With the spacing between rows fixed, altering the seeding rate alters the spacing between seeds in a row.

With a wheat crop on a 12 inch row spacing, there should be about 25 seeds per foot of row, and the distance between seeds is then less than ½ inch. With canola there should be about 5 seeds per foot of row, and the distance between seeds is 2½ inches.

With corn there should be about 0.5 seeds per foot of row, and the distance between seeds 24 inches. For maximum yields however, corn is seeded at a wider row spacing, typically 30 inches or more, with a row type planter. Corn is sometimes seeded with a 12 inch spacing air seeder by only using every other furrow opener so the row spacing is 24 inches and there are thus about 1.0 seeds per foot of row.

Thus it can be seen that to get an even plant spacing, the spacing is much more critical for corn than for either wheat or canola, while the spacing of canola seeds is more critical than for wheat. To achieve the desired even spacing, singulating metering devices are commonly used for planting corn. These typically comprise pockets or recesses on a rotating disc and take the seeds from a seed tank one at a time and drop them into a furrow.

In contrast, seed metering devices for seeding wheat and canola typically work on more of a bulk principal. One typical type of seed metering device includes a rotating feed roller with recesses that can be in the form of grooves extending longitudinally along the length of the outer surface of roller parallel to the axis of rotation, or in the form of notches or pockets or the like spaced evenly along the outer surface of the roller. The feed roller is typically mounted below the feed opening at the bottom of a seed tank and configured such that the intake side of the roller is inside the feed opening exposed to the seeds in the tank and the outer output side is above the furrow in a conventional seeder, or in an air seeder is above the air stream that carries the seeds to the furrow openers to be deposited in the ground. As the roller rotates, seeds fill the recesses and are carried from the seed tank and dropped into the furrow in a conventional seeder, or are fed into the air stream of an air seeder.

The number of seeds dispensed is proportional to the rotational speed of the feed roller or auger, and the rate of metering seeds is adjusted by varying the rotational speed. The rotational speed is also coordinated with ground speed so that the same amount of seed is dispensed for each foot of distance travelled.

As a feed roller rotates, the seed is dispensed essentially in pulses. The recesses spill their contents into the furrow or air stream as they rotate, with one emptying before the next starts to spill. With wheat this is not particularly problematic, as the seed spacing is not so critical, and in addition the volumes of seed required to be dispensed for a typical seeding rate require a rotational speed that is relatively high so that the pulses blend together and the result is a fairly constant flow of wheat seeds that is satisfactory for seeding wheat.

With canola however, the number of seeds that are contained in any particular recess is about 10 times the number of wheat seeds that are contained in. the same groove or recess. In addition it is desired only to have 5 canola seeds per foot instead of 25 wheat seeds, so a feed roller rotating at a speed suitable to dispense the desired rate of wheat seeds will dispense canola seeds at about 50 times the desired rate.

For seeding canola then, the speed of rotation must be reduced to 1/50 the rotational speed for wheat, however reducing the speed that much becomes problematic as the pulsing nature of the flow of canola seeds is accentuated. The flow of canola seeds into the air stream is very uneven, and although the correct number of seeds per foot of row will be dispensed, the seeds will be deposited in the furrow in clumps instead of evenly spaced. In order to address this problem, different feed rollers are often used for wheat and canola. The canola feed rollers will have shallower and smaller recesses such that less seed is dispensed with each revolution, and the rotational speed can be increased and the pulsing effect reduced. The rotational speed of these canola feed rollers however is still very slow, in the order of 1 revolution per minute. At these slow speeds, and given the nature of a canola seed being very small and round, the movement and vibration caused by the seeder travelling along a field causes the canola seed to shake out of the recesses, accentuating the uneven flow.

SUMMARY OF THE INVENTION

It is an object of the present invention to provide a seed metering apparatus for an air seeder that overcomes problems in the prior art.

In prior art feed rollers, the recesses that actually take the seeds from the tank and move them to the air stream are spread along the whole outer surface of the roller from one end to the other. In a typical configuration, the roller will be some inches long and exposed to the seeds in the tank on an intake side and open to the air stream on the output side such that as the roller rotates seeds drop from the recesses into the air stream. In some types of air seeder distribution networks, chutes are provided at the output side to receive the seeds being dispensed and direct same into separate air streams.

Where each air stream is feeding the same number of furrow openers, these chutes will be of equal width so that each air stream receives the same amount of seed. It is also known, where the air streams are feeding different numbers of furrow openers, to vary the chute widths so that the width of the roller feeding each chute is proportional to the number of furrow openers being fed, and so each furrow opener receives the same amount of seed.

In a first embodiment the present invention provides a seed metering apparatus for a seeder. The apparatus comprises a seed container with a feed opening in a bottom thereof. A feed shaft is rotatably mounted in a substantially horizontal orientation extending substantially from a right side of the feed opening to a left side thereof. At least one feed disc is mounted to the feed shaft such that the at least one feed disc and feed shaft rotate together, and a plurality of disc recesses are substantially equally spaced along a periphery of the at least one feed disc. A shield plate extends from the right side of the feed opening to the left side thereof in an upright orientation from a bottom edge thereof to a top edge thereof, the shield plate substantially parallel to and adjacent to a front side of the feed shaft. The shield plate defines a disc slot having a width corresponding to a thickness of the at least one feed disc and configured such that the at least one feed disc can extend through the disc slot with seeds substantially prevented from passing between edges of the disc slot and the at least one feed disc. The feed shaft, at least one feed disc, and shield plate are configured such that the shield plate substantially seals the feed opening, and such that an intake portion of the periphery of the at least one feed disc is located in the feed opening exposed to seeds in the seed container, and such that an output portion of the at least one feed disc extends forward of a front face of the shield plate through the disc slot. Rotation of the feed shaft carries seeds out of the seed container in the disc recesses such that the seeds drop into a seed receiver below the front face of the shield plate.

In a second embodiment the present invention provides a seed metering apparatus for an air seeder. The apparatus comprises a seed container with a feed opening in a bottom thereof. A feed shaft is rotatably mounted in a substantially horizontal orientation extending substantially from a right side of the feed opening to a left side thereof. A plurality of feed discs are mounted to the feed shaft such that the feed discs and feed shaft rotate together, and a plurality of disc recesses are substantially equally spaced along a periphery of each feed disc. A shield plate extends from the right side of the feed opening to the left side thereof in an upright orientation from a bottom edge thereof to a top edge thereof. The shield plate is substantially parallel to and adjacent to a front side of the feed shaft. The shield plate defines a disc slot for each feed disc, the disc slots having a width corresponding to a thickness of the feed discs and configured such that the feed discs can extend through the corresponding disc slots with seeds substantially prevented from passing between edges of the disc slots and the feed discs. The feed shaft, feed discs, and shield plate are configured such that the shield plate substantially seals the feed opening, and such that an intake portion of the periphery of each feed disc is located in the feed opening exposed to seeds in the seed container, and such that an output portion of each feed disc extends forward of a front face of the shield plate through the corresponding disc slots. Rotation of the feed shaft carries seeds out of the seed container in the disc recesses such that the seeds drop into a seed receiver below the front face of the shield plate.

Instead of gathering and dispensing seeds across the entire width of the seed opening the feed disc of the present invention gathers and dispenses seeds from only an area equal to the thickness of the disc. The disc therefore rotates much faster than a conventional feed roller, and thus the flow of seeds from the metering apparatus is much more uniform, and seed spacing in the furrow is thus more uniform. The higher speed also reduces the effects of field vibrations on the seed flow to a negligible amount.

Assemblies with different disc thicknesses and/or disc recess configurations can be interchangeable in the feed opening to provide metering for different sized seeds and different seeding rates. A roller assembly with a conventional feed roller can also be mounted in the feed opening if desired.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
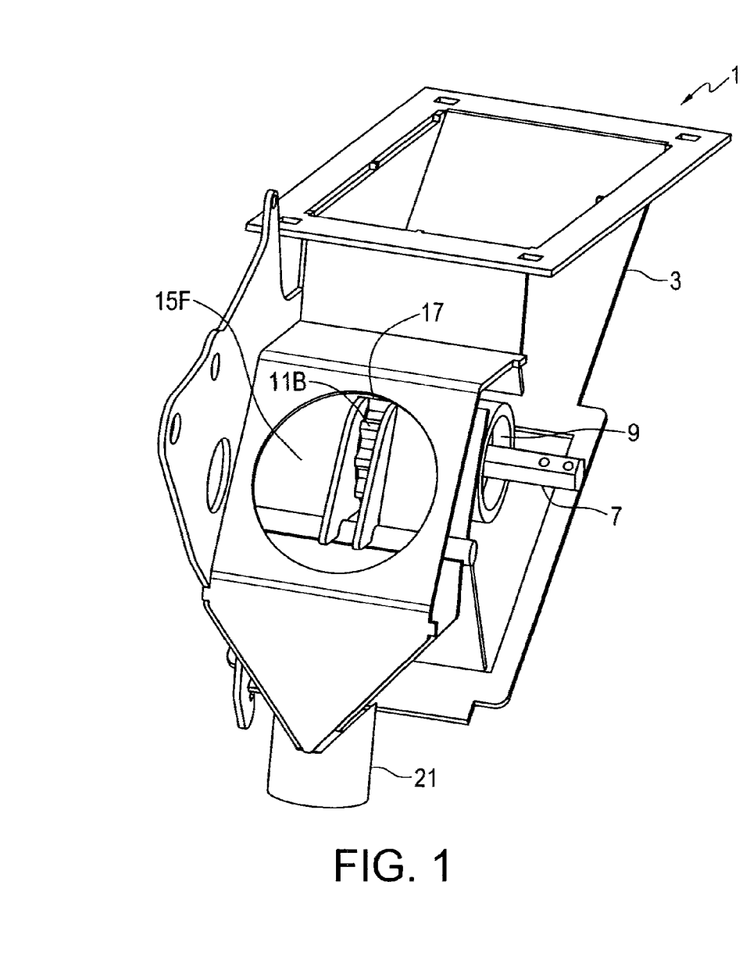
FIG. 1 is a perspective view of an embodiment of a seed metering apparatus of the present invention, the apparatus having a single feed disc.
Figure 2:
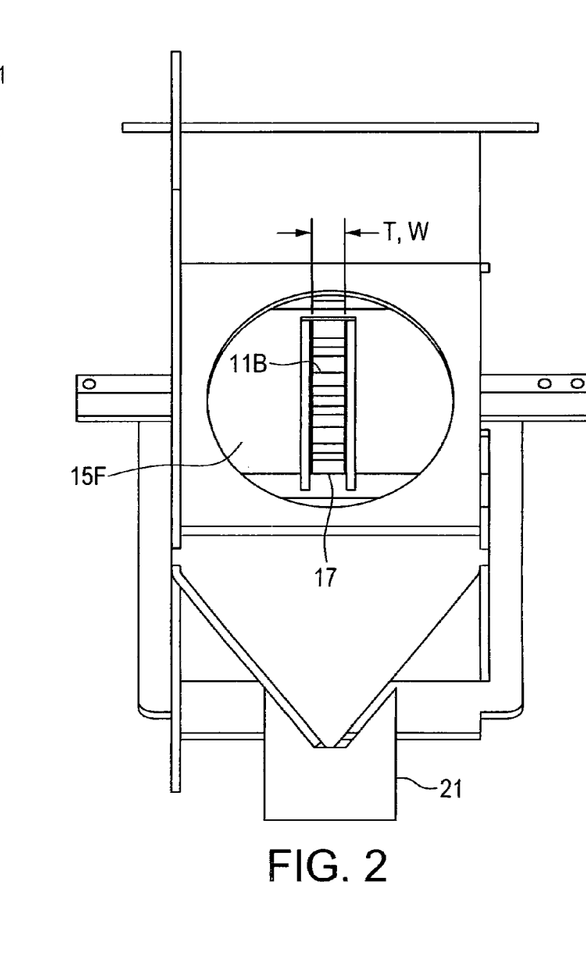
FIG. 2 is a front view of the embodiment of FIG. 1.
Figures 3, 4:
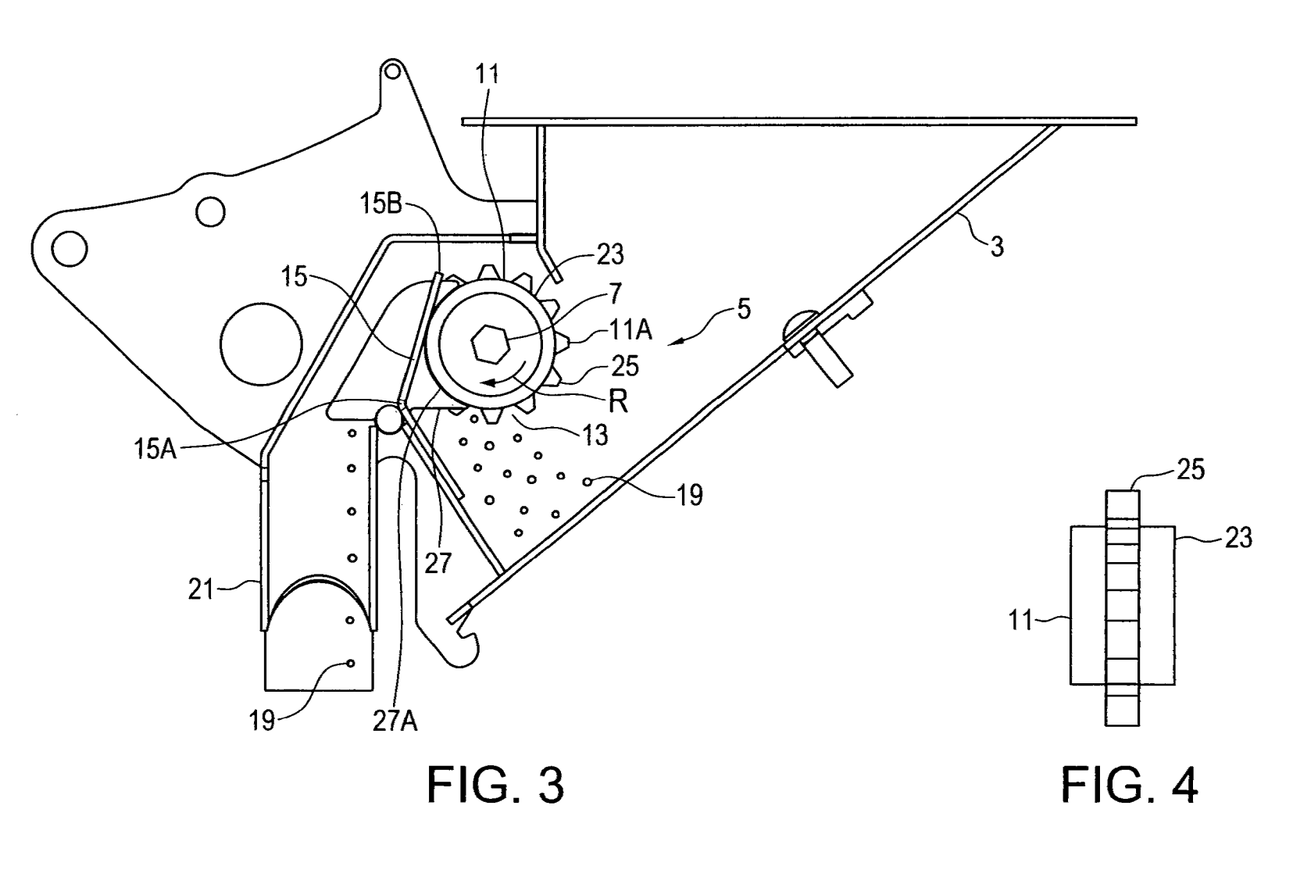
FIG. 3 is a schematic side view of the embodiment of FIG. 1.
FIG. 4 is a front view of the feed disc in the embodiment of FIG. 1.
Figure 5:
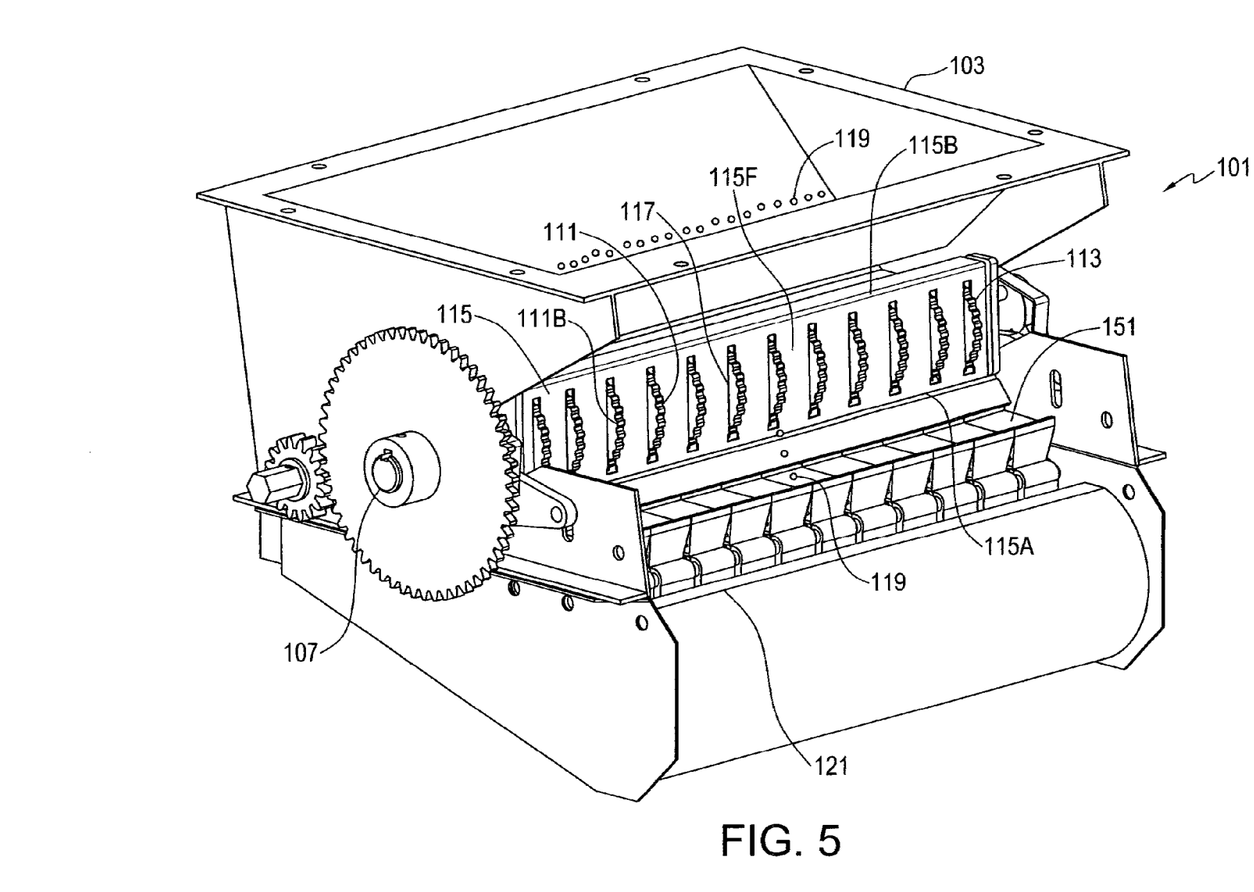
FIG. 5 is a perspective view of an embodiment of a seed metering apparatus of the present invention where the apparatus has a plurality of feed discs.

FIGS. 1-3 illustrate an embodiment of a seed metering apparatus 1 of the present invention for a seeder. The apparatus 1 comprises a seed container 3 with a feed opening 5 in a bottom thereof. The illustrated seed container 3 is a hoppered container that is configured to be attached on the bottom of a large tank such as is used to carry agricultural seeds on an air seeder.

A feed shaft 7 is rotatably mounted in bearings 9 in a substantially horizontal orientation and extends across the feed opening 5 from a right side to a left side thereof A feed disc 11 is mounted to the feed shaft 7 such that the feed disc 11 and feed shaft 7 rotate together. The illustrated feed shaft 7 has a hexagonal cross section as does the inner hole of the feed disc 11 such that both turn together. Other shapes or a keyway or the like could also be used cause both to rotate together. A plurality of disc recesses 13 are equally spaced along a periphery of the feed disc 11.

A shield plate 15 extends from the right side of the feed opening 5 to the left side thereof in a generally upright orientation from a bottom edge 15A thereof to a top edge 15B thereof. The shield plate 15 is parallel to and adjacent to a front side of the feed shaft 7 and defines a disc slot 17 having a width W corresponding to a thickness T of the feed disc 11 such that the feed disc 11 can extend through the disc slot 17 with seeds substantially prevented from passing between edges of the disc slot 17 and the feed disc 11.

The feed shaft 7, feed disc 11, and shield plate 15 are configured such that the shield plate 15 seals the feed opening 5, and such that an intake portion 11A of the periphery of the feed disc 11 is located in the feed opening 5 exposed to seeds 19 in the seed container 3, and such that an output portion 11B of the feed disc 11 extends forward of a front face 15F of the shield plate 15 through the disc slot 17.

Thus in the apparatus 1, rotation of the feed shaft 7 in the direction R carries seeds 19 out of the seed container 5 in the disc recesses 13 such that the seeds 19 drop into a seed receiver 21 below the front face 15F of the shield plate 15. The seed receiver 21 directs the seeds 19 eventually into one or more furrows made by furrow openers of the seeder, Where the seeder is an air seeder, the seed receiver 21 directs the seeds 19 into an air stream for distribution to the furrow openers.

In the illustrated apparatus 1, the feed disc 11 includes an expanded circular core portion 23 that is wider than the disc slot 17, with disc teeth 25 extending from the circular core portion 23 to form the disc recesses 13 and extending through the disc slot 17. The feed disc 11 with circular core portion 23 and disc teeth 25 is illustrated in FIG. 4.

Right and left seed plates 27 extend rearward from a rear face 15B of the shield plate 15 from corresponding right and left edges of the disc slot 17. The rear edges 27A of the seed plates 27 have a circular shape corresponding to the circular core 23 and in proximity to the circular core 23. The seed plates 27 are in close proximity to the sides of the disc teeth 25 such that when the feed disc 11 rotates in direction R, seeds 19 are prevented from moving up between the teeth 25 and the side plates 27, thereby reducing seed damage.

In the illustrated apparatus 1, the seed plates 27 also extend forward from the front face 15F of the shield plate 15 from corresponding right and left edges of the disc slot 17 such that the teeth 25 rotate between the seed plates 27, and seeds 19 carried out of the seed container 5 in the disc recesses 13 are guided to fall downward between the seed plates 27.

Compared to a conventional feed roller with recesses on the entire outer surface thereof and extending across the entire width of the feed opening 5, the illustrated feed disc 111 will turn at a much higher rotational speed to dispense the same rate of seeds from the seed container 3 as the conventional feed roller. Thus a much more uniform flow of seed is received by the seed receiver 21 as pulsations in the flow are much reduced because of the increased rotational speed.

FIGS. 5-9 illustrate an alternate embodiment of a seed metering apparatus 101 of the present invention for use in an air seeder. The apparatus 101 comprises a seed container 103 with a feed opening 105 in a bottom thereof. A feed shaft 107 is rotatably mounted in a substantially horizontal orientation extending substantially from a right side of the feed opening 105 to a left side thereof. A plurality of feed discs 111 are mounted to the feed shaft 107 such that the feed discs 111 and feed shaft 107 rotate together. A plurality of disc recesses 113 are equally spaced along a periphery of each feed disc 111.

A shield plate 115 extends from the right side of the feed opening 105 to the left side thereof in an upright orientation from a bottom edge 115A thereof to a top edge 115B thereof The shield plate 115 is parallel to and adjacent to a front side of the feed shaft 107. The shield plate 115 defines a disc slot 117 for each feed disc 111. The disc slots 117 have a width W corresponding to a thickness T of the feed discs 111 and are configured such that the feed discs 111 can extend through the corresponding disc slots 117 with seeds substantially prevented from passing between edges of the disc slots 117 and the feed discs 111. Thus seeds 119 are prevented from leaking out of the seed container 103.

The feed shaft 107, feed discs 111, and shield plate 115 are configured such that the shield plate 115 substantially seals the feed opening 105, and such that an intake portion 111A of the periphery of each feed disc 111 is located in the feed opening exposed to seeds in the seed container 103, and such that an output portion 111B of each feed disc 111 extends forward of a front face 115F of the shield plate 115 through the corresponding disc slots 117. Rotation of the feed shaft 7 carries seeds 119 out of the seed container 103 in the disc recesses 113 such that the seeds 119 drop into a seed receiver 121 below the front face 115F of the shield plate 115.

Figure 6:
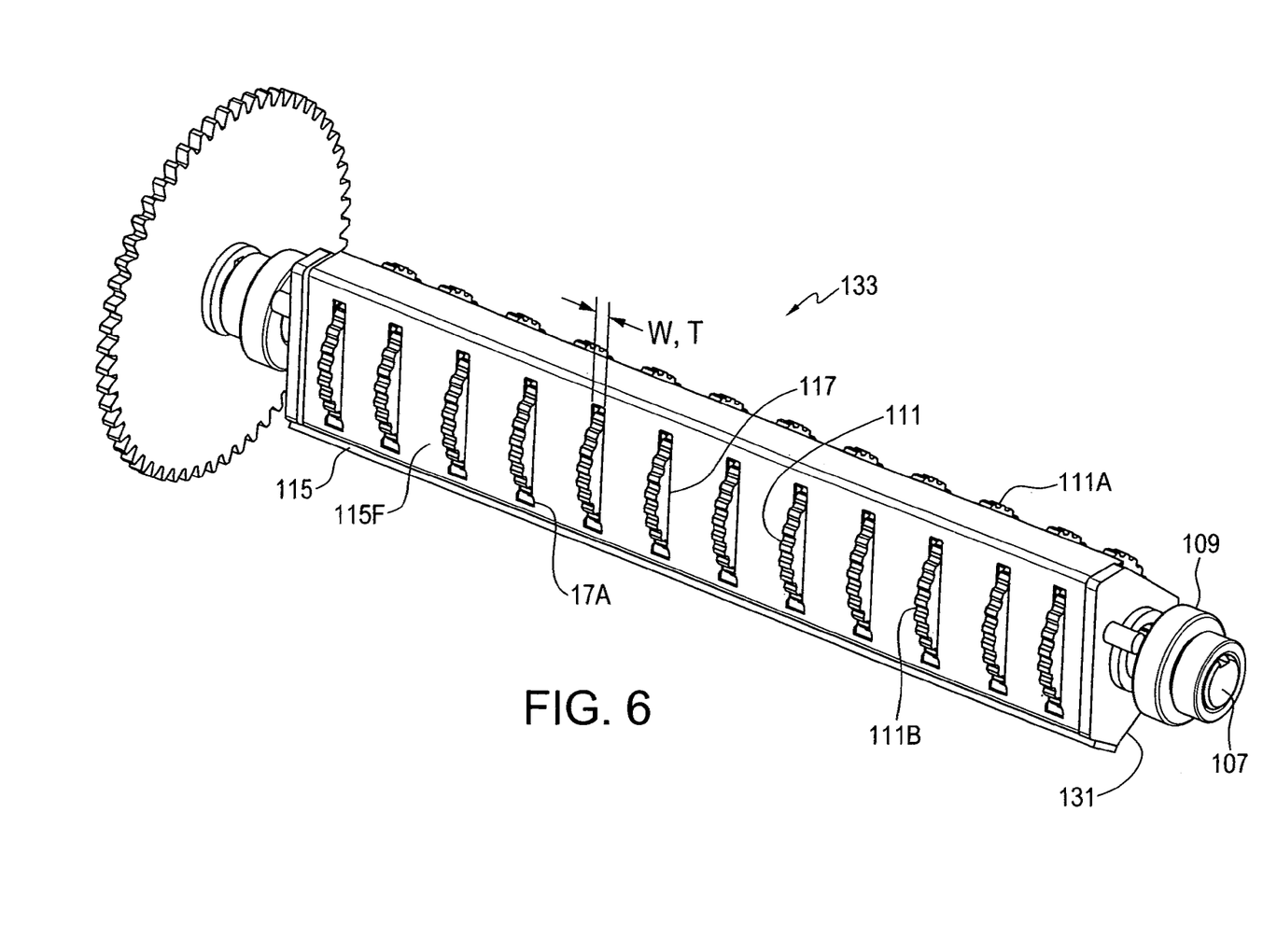
FIG. 6 is a perspective view of the disc assembly of the embodiment of FIG. 5.
Figure 7:
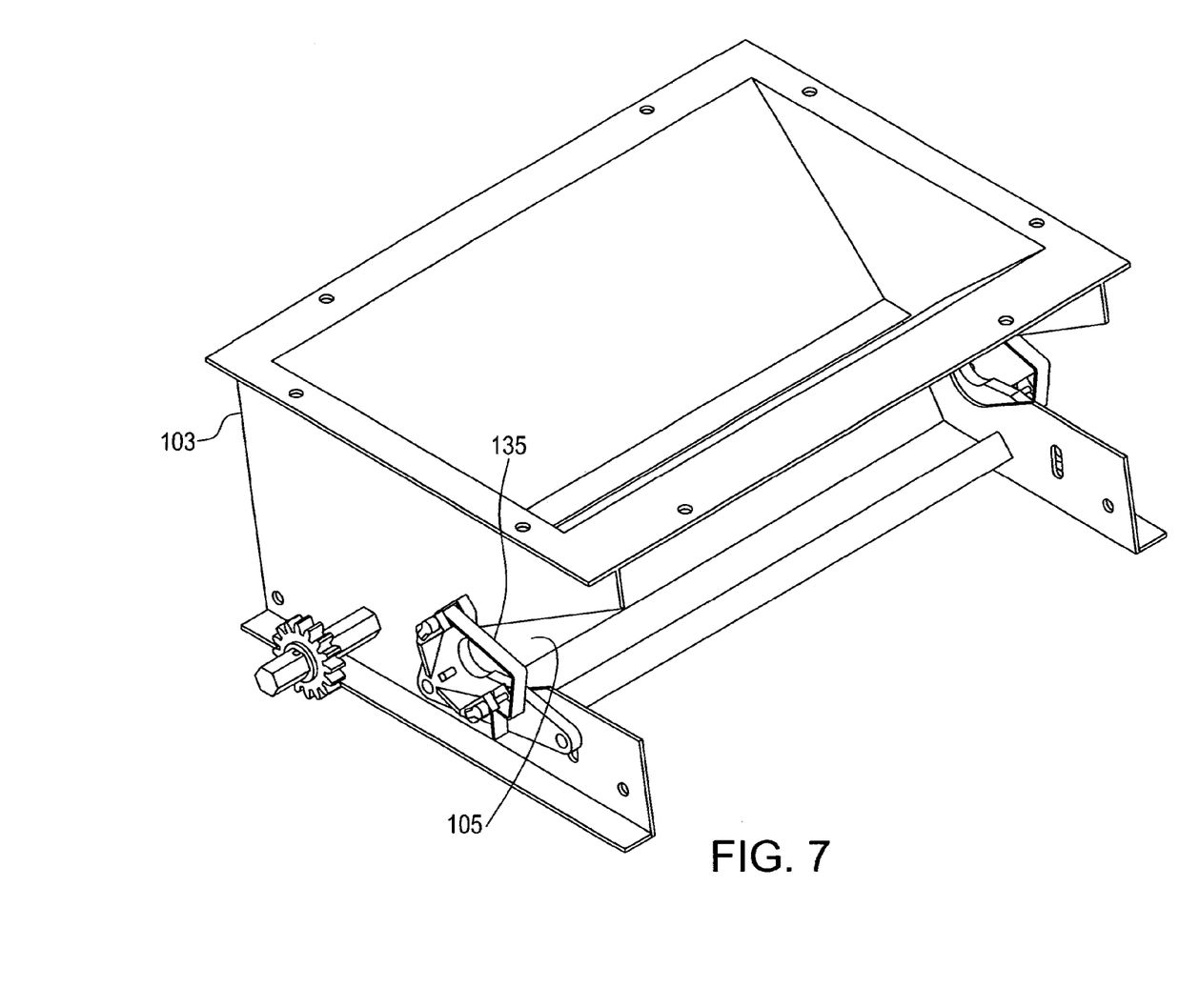
FIG. 7 is a perspective view of the seed container of the embodiment of FIG. 5.
Figures 9, 10:
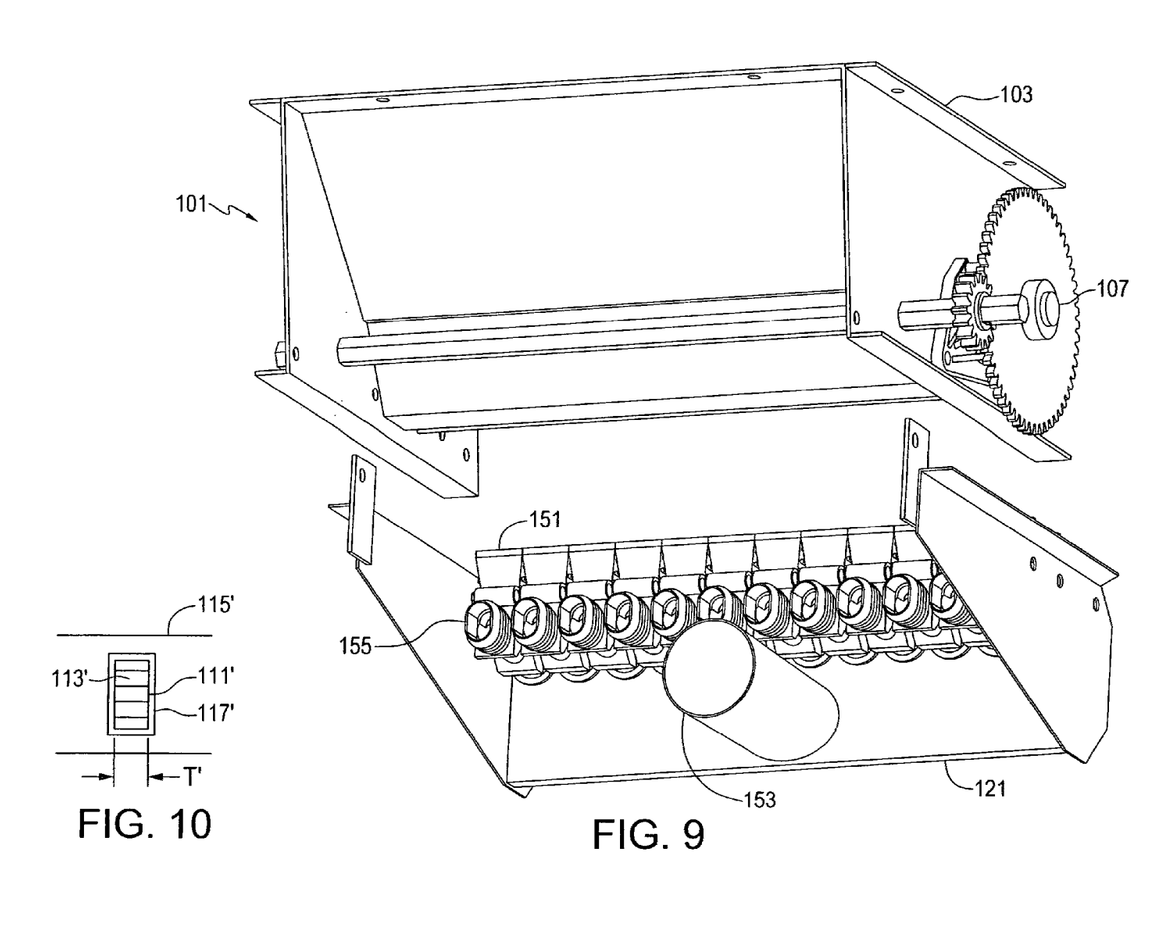
FIG. 9 is a perspective rear view of seed container and seed receiver of the embodiment of FIG. 5 with seed receiver removed.
FIG. 10 is a schematic front view of a feed disc and disc slot that are wider than that shown in the embodiment of FIG. 5.

In the illustrated apparatus 101, as shown in FIG. 6, the feed shaft 107 is rotatably mounted in bearings 109 in end plates 131 of the shield plate 115 such that the feed shaft 107, feed discs 111, and shield plate 115 form a disc assembly 133 that is removably mounted in the feed opening 105. Clips 135 as shown in FIG. 7 can be released to remove the disc assembly 133. Thus the illustrated disc assembly 133 with feed discs 111 having a thickness T and the illustrated configuration of disc recesses 113, can be replaced by a second disc assembly with feed discs 111', as schematically illustrated in FIG. 10, having a greater thickness T' (or a lesser thickness if the situation warrants) and a different configuration of disc recesses 113', and of course a shield plate 115' configured accordingly.

Thus a wide variety of crops can be seeded effectively. For example for seeding small seeds like canola, the thickness of the feed disc 111 will be small, and the disc recesses 113 will likewise be quite small, while for seeding large seeds like corn, a thicker feed disc 111' can be provided with larger disc recesses 113' configured to be more suitable for the larger seeds. It is contemplated that it may be possible to size the recesses 113' to be about the same size as a corn seed, such that the corn seeds are carried out of the seed container 103 one at a time.

Figure 8:
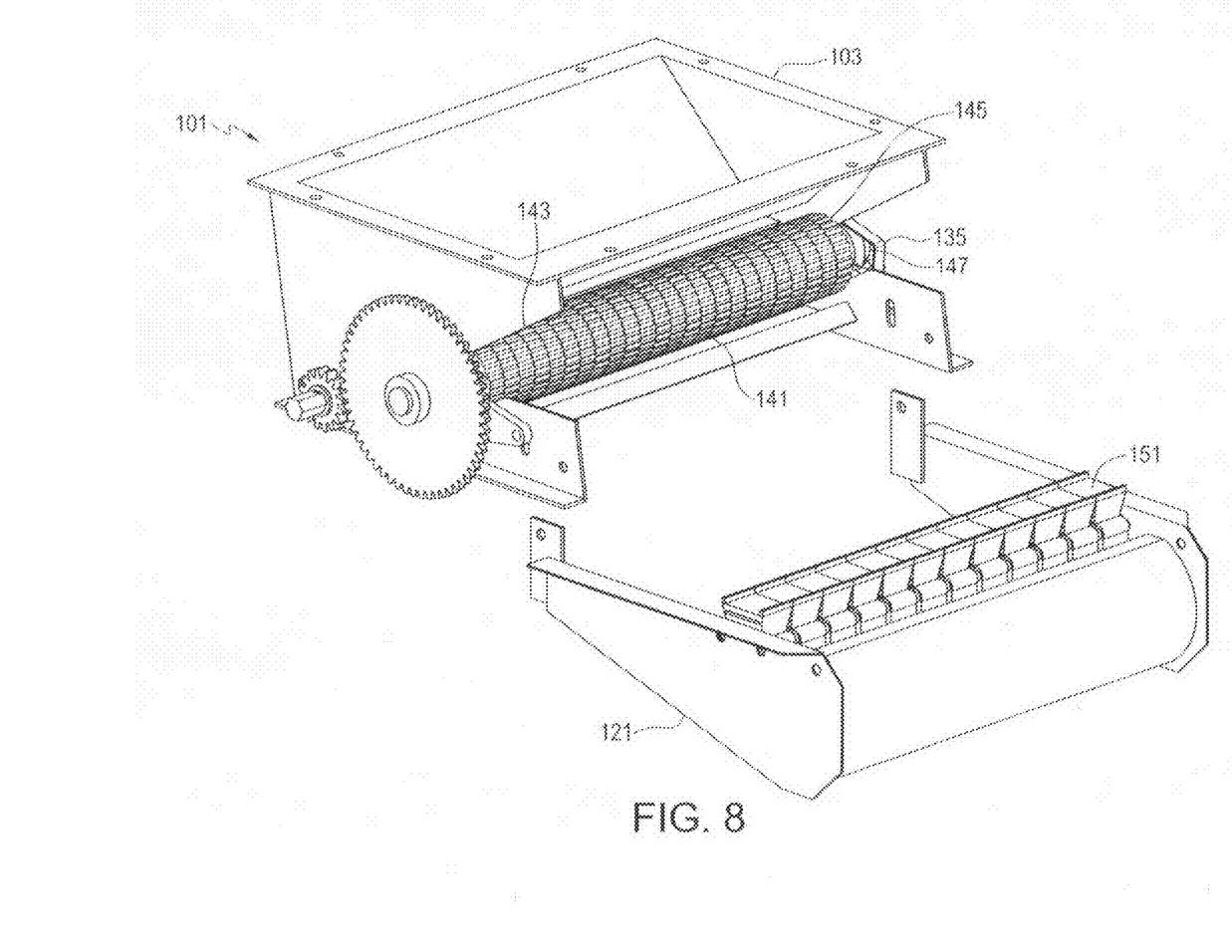
FIG. 8 is a perspective view of the embodiment of FIG. 5 with the disc assembly of FIG. 6 removed and replaced with a conventional feed roller assembly, and with seed receiver removed.

Further in the illustrated apparatus 101 a roller assembly 141, as illustrated in FIG. 8, can be provided to allow seeding still further different types of crops, such as wheat. The roller assembly 141 comprises a feed roller 143 with roller recesses 145 spaced evenly along an outer surface thereof. A bearing 147 is mounted on each end of the feed roller 141 and the roller assembly 141 is configured to removably mount in the feed opening of the seed container 103 secured by the clips 135 in place of the disc assembly 133. The roller assembly 141 is configured such that when the feed roller 143 is stopped, seeds are prevented from moving out of the seed container 103, and such that when the feed roller 143 rotates seeds are moved out of the seed container 103 in the roller recesses 145.

In the illustrated apparatus 101 the seed receiver 121 comprises a chute 151 mounted under each disc slot 117. Each chute 151 is operative to direct received seeds 119 into an air stream of an air seeder for delivery to at least one furrow opener. FIGS. 8 and 9 show the apparatus 101 with the seed receiver 121 removed. A primary air stream is directed into the input port 153 of the seed receiver 121, and is divided into a plurality of separate secondary air streams that exit the seed receiver 121 through output ports 155. The chutes 151 direct the dispensed seeds into the secondary air streams through venturis in the seed receiver, and conduits attached to the output ports carry the secondary air streams AS' and entrained seeds to furrow openers.

Figure 11:
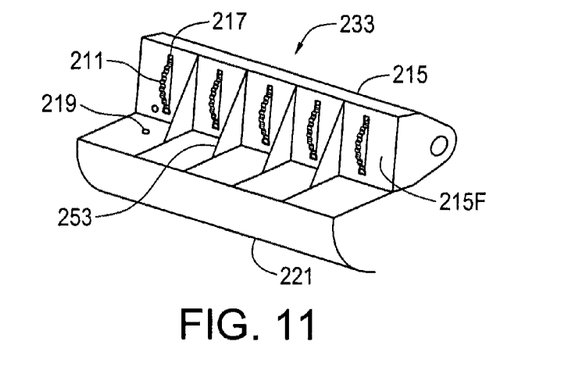
FIG. 11 is a perspective view of a disc assembly with dividers between adjacent disc slots.

FIG. 11 illustrates a disc assembly 233 that includes dividers 253 extending forward from the front face 215F of the shield plate 215 between adjacent slots 215. The dividers 253 are configured to maintain a flow of seeds from one feed disc 211 into the seed receiver 221 separate from the flow of seeds from a second adjacent feed disc 211. Some seed types may be prone to scattering when exiting the disc recesses and such a divider 253 will ensured that the seeds drop into the proper location on the seed receiver 221.

Figure 13:
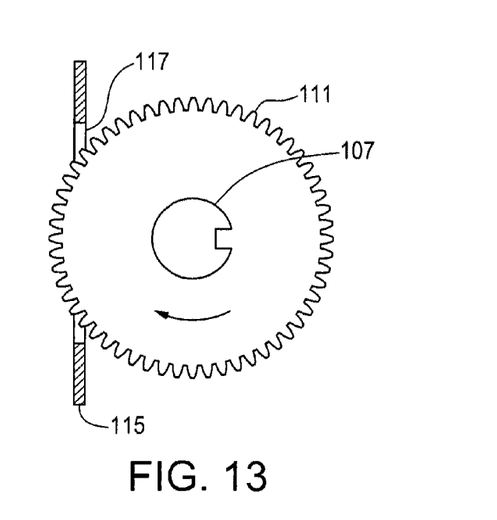
FIG. 13 is a schematic sectional side detail view of the disc slot and feed disc of the embodiment of FIG. 5.

The feed discs 111 can be configured, using a hex shaft such as illustrated in the apparatus 1 of FIG. 1 or using a keyed shaft as schematically illustrated in FIG. 13, or like means known in the art such that the feed discs 111 are slidable along the feed shaft 107. The feed discs 111 will be maintained in position on the feed shaft 107 by their extension through the disc slots 117. Such an arrangement facilitates assembly of the disc assembly 133.

Figure 12:
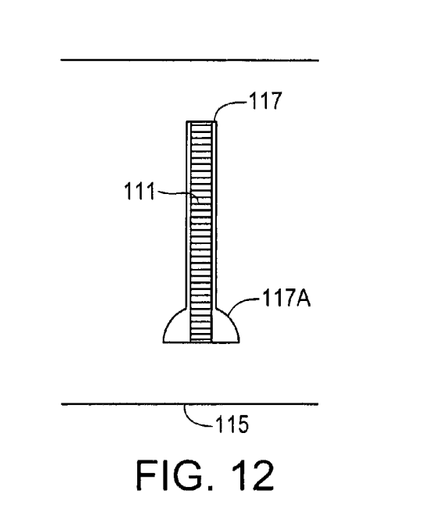
FIG. 12 is a schematic front detail view of the disc slot and feed disc of the embodiment of FIG. 5.

Detailed schematic front and side views of the feed disc 111 and slot 117 are shown in FIGS. 12 and 13. It is contemplated that in a typical application the feed shaft 107 and discs 111 will be rotated in direction R such that rotation of the feed shaft 107 moves a bottom edge of the feed discs 111 forward through the slot 117. In order to reduce jamming of seeds between the edges of the disc slot 117 and the periphery of the feed disc 111, a portion 117A of each disc slot 117 adjacent to a bottom edge of each feed disc 111 is widened to reduce jamming of seeds between the edges of the disc slot 117 and the periphery of the feed disc 111, and reduce seed damage.

As described above the present invention provides a seed metering apparatus for seeders that reduces pulsations in the flow of seeds dispensed, and also reduces the effects of seeder movement vibration on the flow of seeds from the metering device, thereby providing a more uniform flow of metered seeds and improved uniformity of seed placement in furrows.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A seed metering apparatus for a seeder, the apparatus comprising:
    a seed container with a feed opening in a bottom thereof:
    a feed shaft rotatably mounted in a substantially horizontal orientation and extending substantially from a right side of the feed opening to a left side thereof;
    at least one feed disc mounted to the feed shaft such that the at least one feed disc and feed shaft rotate together, and a plurality of projections extending from a periphery of the at least one feed disc, the projections forming disc recesses substantially equally spaced along the periphery of the at least one feed disc;
    a shield plate extending from the right side of the feed opening to the left side thereof in an upright orientation from a bottom edge thereof to a top edge thereof, the shield plate being substantially parallel to, in front of, and adjacent to a front side of the feed shaft, the shield plate defining a disc slot having a width corresponding to a thickness of the at least one feed disc and configured such that the at least one feed disc extends through the disc slot with seeds substantially prevented from passing between edges of the disc slot and the at least one feed disc;
    wherein the feed shaft, at least one feed disc, and shield plate are configured such that the shield plate substantially seals the feed opening, and such that an intake portion of the periphery of the at least one feed disc is located in the feed opening exposed to seeds in the seed container, and such that an output portion of the at least one feed disc extends forward of a front face of the shield plate through the disc slot; and
    wherein rotation of the feed shaft carries seeds out of the seed container in the disc recesses such that the seeds drop into a seed receiver below the front face of the shield plate.

2. The apparatus of claim 1 comprising a plurality of feed discs mounted on the feed shaft and corresponding disc slots in the shield plate.

3. The apparatus of claim 2 wherein the feed shaft is rotatably mounted in end plates of the shield plate such that the feed shaft, feed discs, and shield plate form a disc assembly that is removably mounted in the feed opening.

4. The apparatus of claim 3 comprising a first disc assembly with first feed discs having a first thickness and a first disc recess configuration, and a second disc assembly with second feed discs having a second thickness and a second disc recess configuration.

5. The apparatus of claim 3 further comprising a roller assembly comprising a feed roller with roller recesses spaced evenly along an outer surface thereof, and a bearing mounted on each end of the feed roller, the roller assembly configured to removably mount in the feed opening, and configured such that when the feed roller is stopped, seeds are prevented from moving out of the seed container, and such that when the feed roller rotates seeds are moved out of the seed container in the roller recesses.

6. The apparatus of claim 2 wherein the seed receiver comprises a chute mounted under each disc slot, each chute operative to direct received seeds into an air stream of an air seeder.

7. The apparatus of claim 6 comprising a divider extending forward from the front face of the shield plate between adjacent slots and configured to maintain a flow of seeds from a first feed disc into the seed receiver separate from the flow of seeds from a second adjacent feed disc.

8. The apparatus of claim 2 wherein the feed discs are slidable along the feed shaft and are maintained in position on the feed shaft by the disc slots.

9. The apparatus of claim 2 wherein rotation of the feed shaft moves a bottom edge of the feed discs forward through the slot, and wherein a portion of each disc slot adjacent to a bottom edge of each feed disc is widened to reduce jamming of seeds between the edges of the disc slot and the periphery of the feed disc.

10. The apparatus of claim 1 comprising right and left seed plates extending rearward from a rear face of the shield plate on corresponding right and left edges of the disc slot adjacent to sides of the disc.

11. The apparatus of claim 10 wherein the seed plates extend forward from the front face of the shield plate from corresponding right and left edges of the disc slot such that the disc rotates between the seed plates.

12. The apparatus of claim 10 wherein the at least one feed disc comprises an expanded circular core portion that is wider than the disc slot, with disc teeth extending from the circular core portion to form the disc recesses and extending through the disc slot, and wherein rear edges of the seed plates have a circular shape corresponding to the circular core portion and in proximity to the circular core portion.

13. A seed metering apparatus for an air seeder, the apparatus comprising:
 a seed container with a feed opening in a bottom thereof:
 a feed shaft rotatably mounted in a substantially horizontal orientation and extending substantially from a right side of the feed opening to a left side thereof;
 a plurality of feed discs mounted to the feed shaft such that the feed discs and feed shaft rotate together, and a plurality of projections extending from a periphery of each feed disc, the projections forming disc recesses substantially equally spaced along the periphery of the at least one feed disc;
 a shield plate extending from the right side of the feed opening to the left side thereof in an upright orientation from a bottom edge thereof to a top edge thereof, the shield plate being substantially parallel to, in front of, and adjacent to a front side of the feed shaft, the shield plate defining a disc slot for each feed disc, the disc slots having a width corresponding to a thickness of the feed discs and configured such that the feed discs extend through the corresponding disc slots with seeds substantially prevented from passing between edges of the disc slots and the feed discs;
 wherein the feed shaft, feed discs, and shield plate are configured such that the shield plate substantially seals the feed opening, and such that an intake portion of the periphery of each feed disc is located in the feed opening exposed to seeds in the seed container, and such that an output portion of each feed disc extends forward of a front face of the shield plate through the corresponding disc slots; and
 wherein rotation of the feed shaft carries seeds out of the seed container in the disc recesses such that the seeds drop into a seed receiver below the front face of the shield plate.

14. The apparatus of claim 13 wherein the feed shaft is rotatably mounted in end plates of the shield plate such that the feed shaft, feed discs, and shield plate form a disc assembly that is removably mounted in the feed opening.

15. The apparatus of claim 14 comprising a first disc assembly with first feed discs having a first thickness and a first disc recess configuration, and a second disc assembly with second feed discs having a second thickness and a second disc recess configuration:

16. The apparatus of claim 14 comprising a roller assembly comprising a feed roller with roller recesses spaced evenly along an outer surface thereof, and a bearing mounted on each end of the feed roller, the roller assembly configured to removably mount in the feed opening, and configured such that when the feed roller is stopped, seeds are prevented from moving out of the seed container, and such that when the roller rotates seeds are moved out of the seed container in the roller recesses.

17. The apparatus of claim 13 wherein the seed receiver comprises a chute mounted under each disc slot, each chute operative to direct received seeds into an air stream of an air seeder.

18. The apparatus of claim 17 comprising a divider extending forward from the front face of the shield plate between adjacent slots and configured to maintain a flow of seeds from a first feed disc into the seed receiver separate from the flow of seeds from a second adjacent feed disc.

19. The apparatus of claim 13 wherein the feed discs are slidable along the feed shaft and are maintained in position on the feed shaft by the disc slots.

20. The apparatus of claim 13 wherein rotation of the feed shaft moves a bottom edge of the feed discs forward through the slot, and wherein a portion of each disc slot adjacent to a bottom edge of each feed disc is widened to reduce jamming of seeds between the edges of the disc slot and the periphery of the feed disc.

21. The apparatus of claim 13 comprising right and left seed plates extending rearward from a rear face of the shield plate on corresponding right and left edges of at least one disc slot adjacent to sides of a disc in the disc slot.

22. The apparatus of claim 21 wherein the seed plates extend forward from the front face of the shield plate from corresponding right and left edges of the disc slot such that the disc rotates between the seed plates.

* * * * *